Figures 1, 2:
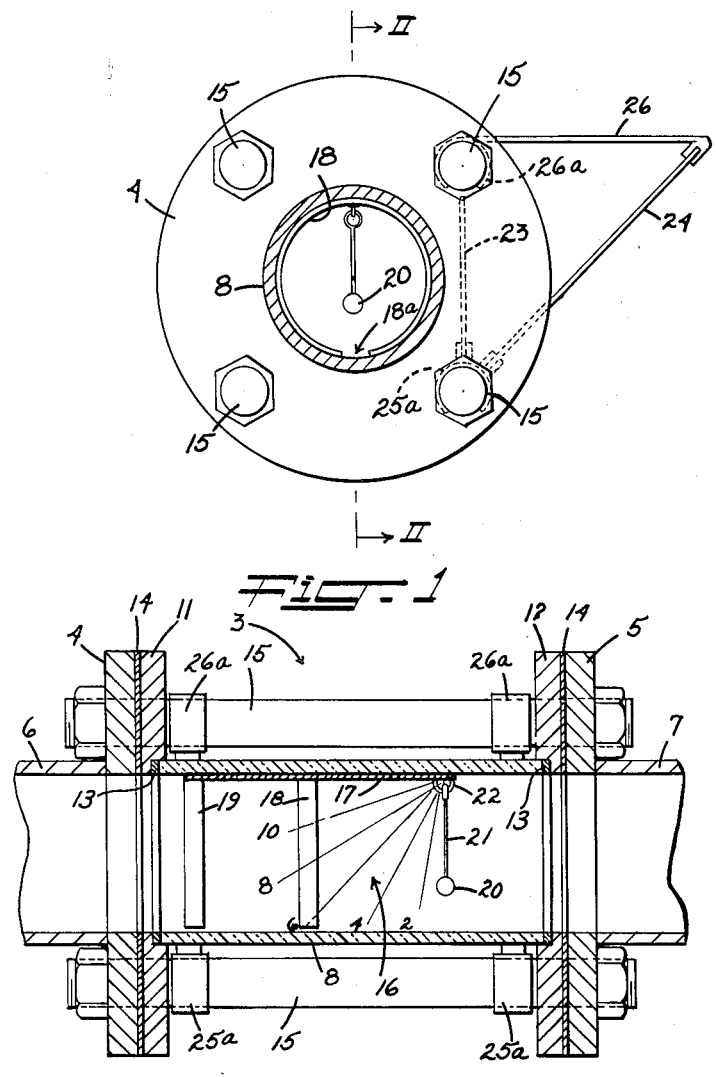

Feb. 21, 1956 W. E. DUNGAN ET AL 2,735,300

FLOW INDICATOR

Filed Aug. 16, 1952

INVENTORS.
WILLIAM E. DUNGAN
RAYMOND L. WATROUS, JR.

BY Thomas B. O'Malley
ATTORNEY.

United States Patent Office 2,735,300
Patented Feb. 21, 1956

2,735,300

FLOW INDICATOR

William E. Dungan, Salem, and Raymond L. Watrous, Jr., Roanoke, Va., assignors to American Viscose Corporation, Philadelphia, Pa., a corporation of Delaware Application August 16, 1952, Serial No. 304,796

2 Claims. (Cl. 73—228)

The present invention relates to indicators for the measurement of the rate of flow of fluids through a conduit or the like and more particularly to a fluid flow indicator which is especially useful in the measurement of the rate of flow of relatively viscous fluids through conduits.

In handling various types of relatively viscous fluids, it oftentimes becomes desirable to measure and/or control the flow of the same from one point to another. Thus, for example, in the manufacture of regenerated cellulose from viscose and other similar well-known fiber or film-forming compositions, it is ordinarily important to accurately control within specified limits the delivery of the composition to the extrusion apparatus. Although various types of fluid flow meters and the like have been devised and used in the past for such purposes, they have oftentimes been found to be relatively intricate and complex in structure.

It is a principal object of the present invention to provide a novel and improved apparatus for measuring the rate of flow of a relatively viscous fluid through a conduit or the like.

It is a further object of the present invention to provide a novel and improved fluid flow measuring apparatus which is of unique construction, easily manufactured, and readily and simply operated.

Other objects and advantages of the invention will be apparent from the following description.

In the drawing which is illustrative of the invention,

Fig. 1 is an end view of a preferred embodiment of the present invention positioned in a tubular conduit which is shown in section; and Fig. 2 is a section along reference line II—II in Fig. 1 of the drawing.

In general the improved fluid flow measuring apparatus of the present invention includes a fluid conduit, a transparent section in the conduit, and means pendant from an upper portion of the transparent section which is angularly displaced from its normal vertical position by the flow of a fluid through the conduit. It has been found that a relatively accurate measurement of the flow of a viscous substance may be readily and easily determined with such apparatus.

A preferred embodiment of the fluid flow measuring apparatus of the present invention is shown in Figs. 1 and 2 of the drawing. As illustrated therein, the fluid flow measuring apparatus which is generally designated by the reference numeral 3 is positioned between the flanged extremities 4 and 5 of the pipe or conduit sections 6 and 7. The opposite extremities of the pipe sections though not shown on the drawing, are connected in any suitable manner to any pair of points between which the fluid medium is to be conveyed.

The transparent section of the fluid conduit which includes the elongated glass tube or the like 8 is preferably positioned as shown in Figure 2 of the drawing in the inset or grooved portions of the annular flange members 11 and 12. The elongated studs 15, which extend between the flanged extremities 4 and 5 of the pipe sections 6 and 7 and through the flange members 11 and 12, are adapted to securely position the glass tube 8 in the fluid conduit or line without placing undue stress thereon. The annular gaskets 13 which are positioned between the flange members 11 and 12 and opposite extremities of the glass tube and the annular gaskets 14 which are positioned between the flange members 11 and 12 and the flanged extremities of the fluid conduit sections 6 and 7 are adapted to prevent undesired seepage of the fluid.

The inside diameter of the transparent tube 8 is preferably though not necessarily substantially the same as the inside diameter as the conduit sections 6 and 7. Moreover, though the tube 8 is shown in the drawing as being substantially in a horizontal position, the same could be appreciably inclined thereto without departing from the spirit or scope of the present invention.

The fluid flow indicating device which is positioned within the transparent glass tube 8 and which is generally designated in the drawing by the reference numeral 16 includes the elongated strip 17, the spaced resilient members 18 and 19 suitably secured thereto, and the weighted member 20 which is suspended from one extremity thereof. The resilient members are adapted to grip the inner periphery of the glass tube so as to securely position the indicating device 16 within the transparent section of the conduit.

As shown in Fig. 1 of the drawing, in order to facilitate a preferred orientation of the indicating device within the transparent tube 8 whereby the weighted member 20 is suspended from a point approximately vertically above the center of the tube, the gap 18a between opposite extremities of each of the resilient members 18 and 19 is preferably dimensioned substantially the same as the diameter or width of the weighted member. In this way a mere alignment of the gaps 18a with a projection of the width of the weighted member provides a simple and convenient way of orienting the indicating device in the transparent tube 8.

The weighted member 20, which preferably takes the form of the stainless steel ball shown in the drawing, is preferably streamlined so as to minimize the turbulence of the fluid as it passes through the conduit. It is preferably suspended from the strip 17 beyond the center of the tube 8 by means of the relatively narrow steel wire or the like 21. In this way as will be more apparent hereinafter a maximum degree of sensitivity of the indicating device is obtained for a minimum amount of interference of flow of the fluid. The upper extremity of the wire or the like 21 is pivotably secured to the extremity of the elongated strip 17 as at 22 in chain-link fashion preferably by a single pair of open interlocked rings or loops so as to minimize the collection of the viscous fluid thereat and to better ensure free unimpeded angular movement of the weighted member.

The suitably calibrated transparent plate member 23 and the mirror 24 which is associated therewith are preferably employed as shown in Fig. 1 of the drawing to facilitate a more accurate determination of the angular displacement of the weighted member. Thus, the mirror and the calibrated plate are preferably mounted as shown between an adjacent pair of studs 15 by the bracket members 25 and 26 which are in turn removably secured to the studs by their resilient clip-like extremities 25a and 26a. Though the mirror 24 is shown positioned so as to facilitate a viewing of the indicating device from above the fluid conduit, it is to be understood that the mirror could be eliminated or oriented in any other suitable manner so as to facilitate observation of the indicating device from other positions without departing from the spirit or scope of the present invention. Moreover it is also to be understood that a portion of the glass tube itself could be suitably flattened in a vertical plane and/or inscribed so that the calibrated member 23 as well as the mirror 24 could be eliminated without departing from the spirit or scope of the present invention.

In operation the fluid flow indicating device which is constructed in accordance with the present invention is inserted preferably permanently in the fluid conduit through which the relatively viscous fluid is to pass. Dependent on the rate of flow of the fluid therethrough the weighted member 20 is displaced angularly in the direction of its flow and, if the viscosity of the fluid which is used is substantially constant, an appropriate calibration of the indicia on the transparent plate 23 provides a relatively accurate flow reading in volumetric units per unit of time.

When and if the viscous fluid collects and hardens adjacent the chain-link pivot 22 for the suspended weighted member 20, it is to be noted that it is a relatively simple matter to dismantle the transparent section 3 from the conduit, to slidably remove the indicating device from the glass tube, to dissolve or otherwise appropriately remove the hardened fluid which impedes free movement of the weighted member about its pivot point and to reassemble the device in the conduit.

Though the fluid flow indicating device of the present invention has been described and disclosed heretofore as a means of measuring the absolute rate of flow of a viscous fluid, it is to be understood that it also has considerable practical value in the measurement of the relative rate of flow of the same. Thus, for example, in handling, ageing, and processing viscous solutions for the manufacture of regenerated cellulose or the like where it is often desirable and expedient to employ two or more pumping devices which are connected to the fluid conduit system in parallel, an indicating device of the present invention may be provided in the discharge connection to each pump to provide an easy determination of the actual division of the load between the two pumps.

While preferred embodiments of the invention have been disclosed, the description is intended to be illustrative only and it is to be understood that changes and variations may be made without departing from the spirit and scope of the invention as defined by the appended claims.

We claim:

1. Flow-measuring apparatus for relatively viscous fluids comprising a substantially horizontal fluid conduit, a transparent section in the conduit, a relatively heavy weight member suspended from the top of said transparent section so that the center of mass of the weight member under no flow conditions in the conduit is no higher than the center of the conduit, a length of filamentary material for suspending said weight, and a detachable support in the transparent section to which said filamentary material is connected.

2. Flow-measuring apparatus for relatively viscous fluids comprising a substantially horizontal fluid conduit, a transparent section in the conduit, a bracket removably clamped in the bore of said conduit, a relatively heavy weight suspended from an upper portion of said bracket so that the center of mass of the weight member under no flow conditions in the conduit is no higher than the center of the conduit, and a wire connecting the weight and said bracket.

References Cited in the file of this patent

UNITED STATES PATENTS

| | | |
|---|---|---|
| 1,042,730 | Walquist | Oct. 29, 1912 |
| 2,219,677 | Benzin | Oct. 29, 1940 |
| 2,409,430 | Greenleaf | Oct. 15, 1946 |

FOREIGN PATENTS

| | | |
|---|---|---|
| 590,259 | Germany | Dec. 30, 1933 |
| 613,282 | France | Oct. 20, 1926 |
| 851,133 | Germany | Oct. 2, 1952 |